(12) United States Patent
Bolton et al.

(10) Patent No.: US 7,762,373 B2
(45) Date of Patent: Jul. 27, 2010

(54) FAN NOISE CONTROL APPARATUS

(75) Inventors: J. Stuart Bolton, West Lafayette, IN (US); Moohyung Lee, Lafayette, IN (US); Kenichi Seki, Tokyo (JP); Hiroto Ido, Chiba (JP)

(73) Assignee: Sony Corporation, Tokyo (JP)

( * ) Notice: Subject to any disclaimer, the term of this patent is extended or adjusted under 35 U.S.C. 154(b) by 1114 days.

(21) Appl. No.: 11/382,384

(22) Filed: May 9, 2006

(65) Prior Publication Data

US 2006/0269077 A1 Nov. 30, 2006

Related U.S. Application Data

(60) Provisional application No. 60/684,476, filed on May 25, 2005.

(51) Int. Cl.
- *F01N 1/06* (2006.01)
- *H02K 5/24* (2006.01)
- *H05K 7/20* (2006.01)
- *H02K 5/00* (2006.01)
- *H05K 7/00* (2006.01)
- *G06F 1/20* (2006.01)

(52) U.S. Cl. .................. 181/225; 181/202; 181/206; 361/694; 361/695; 361/690; 361/679.48; 361/678

(58) Field of Classification Search ............. 181/225, 181/198, 201, 202, 206, 226; 361/694, 695, 361/690, 691, 679.48, 679.49, 676, 678; 381/71.1, 71.7, 71.2, 71.3, 73.1; 415/119
See application file for complete search history.

(56) References Cited

U.S. PATENT DOCUMENTS

| | | | | |
|---|---|---|---|---|
| 1,948,755 A | * | 2/1934 | Gullicksen | ............. 454/343 |
| 4,146,112 A | * | 3/1979 | Usry | ............. 181/202 |
| 4,158,875 A | * | 6/1979 | Tajima et al. | ............. 361/695 |
| 4,264,282 A | * | 4/1981 | Crago | ............. 417/243 |
| 4,266,602 A | | 5/1981 | White et al. | |
| 4,753,318 A | * | 6/1988 | Mizuno et al. | ............. 181/204 |
| 4,894,749 A | * | 1/1990 | Elko et al. | ............. 361/690 |
| 5,343,713 A | * | 9/1994 | Okabe et al. | ............. 62/296 |
| 5,360,469 A | * | 11/1994 | Baron et al. | ............. 95/273 |
| 5,692,054 A | * | 11/1997 | Parrella et al. | ............. 381/71.3 |
| 5,792,999 A | * | 8/1998 | Arnold et al. | ............. 181/141 |
| 5,860,400 A | * | 1/1999 | Stuart et al. | ............. 123/184.53 |
| 6,034,737 A | * | 3/2000 | Koyama et al. | ............. 348/552 |
| 6,086,476 A | | 7/2000 | Paquin et al. | |
| 6,141,213 A | | 10/2000 | Antonuccio et al. | |
| 6,454,527 B2 | | 9/2002 | Nishiyama et al. | |
| 6,488,472 B1 | * | 12/2002 | Miyazawa | ............. 416/144 |
| 6,538,881 B1 | * | 3/2003 | Jeakins et al. | ............. 361/679.46 |
| 6,641,364 B1 | | 11/2003 | Lee | |
| 6,644,918 B2 | * | 11/2003 | Masuo | ............. 415/220 |
| D488,451 S | * | 4/2004 | Niitsu | ............. D14/126 |
| D491,541 S | * | 6/2004 | Kubota | ............. D14/126 |
| 6,757,029 B2 | * | 6/2004 | Kurihara | ............. 348/731 |
| 6,761,159 B1 | * | 7/2004 | Barnes et al. | ............. 126/21 R |
| 6,790,012 B2 | * | 9/2004 | Sharp et al. | ............. 417/201 |
| D500,991 S | * | 1/2005 | Niitsu | ............. D14/126 |

(Continued)

*Primary Examiner*—Edgardo San Martin
(74) *Attorney, Agent, or Firm*—Baker & Daniels LLP

(57) ABSTRACT

A fan noise control apparatus is provided to facilitate the reduction of noise. According to the preferred embodiments, an acoustically transparent portion is provided to permit noise from one source to pass through to interact and cancel with another noise.

20 Claims, 6 Drawing Sheets

U.S. PATENT DOCUMENTS

| | | | |
|---|---|---|---|
| 7,284,952 B2 * | 10/2007 | Huang et al. | 415/119 |
| 7,353,908 B1 * | 4/2008 | French | 181/206 |
| 7,497,300 B2 * | 3/2009 | D'Angelo | 181/241 |
| 7,644,803 B2 * | 1/2010 | Hashizume | 181/225 |
| 2005/0276684 A1 * | 12/2005 | Huang et al. | 415/119 |
| 2008/0094795 A1 * | 4/2008 | Neal et al. | 361/687 |
| 2009/0308685 A1 * | 12/2009 | Gorny et al. | 181/205 |
| 2010/0002385 A1 * | 1/2010 | Lyon et al. | 361/695 |
| 2010/0006097 A1 * | 1/2010 | Frater et al. | 128/204.18 |
| 2010/0028134 A1 * | 2/2010 | Slapak et al. | 415/119 |

* cited by examiner

FAN NOISE CONTROL APPARATUS

RELATED APPLICATIONS

This application claims priority to U.S. Provisional Patent Application Ser. No. 60/684,476, titled "Fan Noise Control Apparatus," filed May 25, 2005, to J. Stuart Bolton et al., the disclosure of which is expressly incorporated by reference herein.

BACKGROUND OF THE INVENTION

The present invention relates generally to noise control. More particularly, the present invention relates to an apparatus for controlling noise generated by a fan.

BACKGROUND AND SUMMARY

Electronic components often generate heat that must be removed to avoid overheating. In many instances, fans are provided to blow air over these electronic components to remove the heat generated. One drawback of such fans is that they can create noise that can be annoying.

An air-cooled electronic apparatus is provided. This apparatus includes a housing having an acoustically transparent portion, an interior region, and an exterior region. This apparatus further includes electronic components positioned in the interior region of the housing that generate heat and a fan creating air flow through the housing to remove the heat from the interior region of the housing. The fan creates a pressure difference between the interior and exterior regions. A substantial portion of the pressure difference is maintained over the acoustically transparent portion of the housing. The fan creates a first noise source and a second noise source that is out of phase with the first noise source. Noise from the first noise source passes through the acoustically transparent portion of the housing to cancel noise from the second noise source.

According to another aspect of the invention, an air moving apparatus is provided. The apparatus includes a housing having an inlet, an outlet, and a noise transfer portion that is acoustically transparent and substantially air impermeable. This apparatus further includes a fan creating a flow of air through the housing from the inlet to the outlet. A first portion of noise generated by the fan passes through the noise transfer portion of the housing and cancels with a second portion of noise generated by the fan.

According to another aspect of the invention, a noise reduction arrangement is provided. This arrangement includes a housing having a pressurized first region and a noise transmission portion separating the pressurized first region from a second region. The noise transmission portion substantially blocks the flow of air between the first and second regions. The arrangement further includes a first noise source emitting noise into the pressurized first region and a second noise source emitting noise into the second region. Noise from at least one of the first and second noise sources passes through the noise transmission portion of the housing to cancel with noise from the other of the first and second noise sources.

According to another aspect of the present invention, an apparatus is provided with acoustically transparent portions to allow noise to escape from an interior or other portion of the apparatus.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
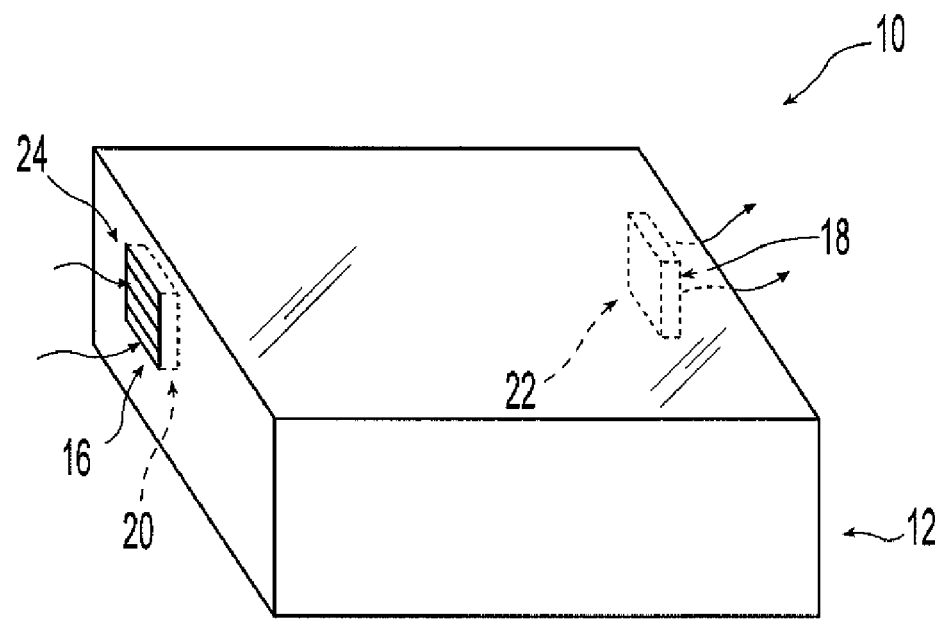
FIG. 1 is a perspective view of an air-cooled, electronic apparatus showing the apparatus including a housing having an inlet and an outlet (not shown) and a pair of fans (shown in phantom), one of the fans is positioned adjacent to the inlet to pull air into the housing and one of the fans is positioned adjacent to the outlet to push air out of the housing.
Figure 2:
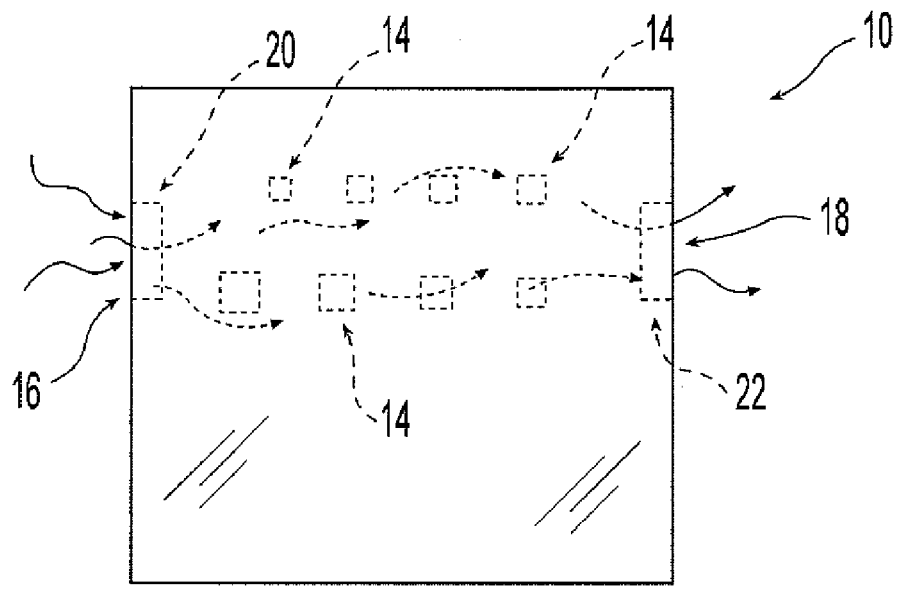
FIG. 2 is a top plan view of the electronic apparatus of FIG. 1 showing the fans positioned adjacent the left and right edges of the housing and a plurality of electronic components (shown in phantom) that generate heat removed by air flowing through the housing.

A prior art air-cooled electronic apparatus 10 is shown in FIG. 1. Apparatus 10 is provided for a flat panel television (not shown) and includes a stamped steel housing 12 and several electronic components 14 positioned in an interior of housing 12 as shown in FIG. 2 in phantom. Typically, electronic components 14 generate waste heat during operation. To avoid overheating these and other components, this waste heat must be removed from the interior region of housing 12 or the components may fail. One way to remove this heat is to blow air from outside of housing 12 over electronic components 14.

Housing 12 of apparatus 10 includes an inlet 16 and an outlet 18 to facilitate the flow of air into and out of housing 12 to remove the waste heat. Apparatus 10 also includes an inlet fan 20 and an outlet fan 22 that pull air into inlet 16 and push air out of outlet 18. As shown in FIG. 2, air flows between inlet 16 and outlet 18 and flows over components 14 and removes enough waste heat from the interior of housing 12 to avoid overheating. Additional details of suitable fans are provided in U.S. Pat. Nos. 6,129,528; 6,488,472; and 6,644,918, the disclosures of which are expressly incorporated by reference herein. Housing 12 is 42 cm long, 34 cm wide, and 7 cm tall. Fans 20, 22 are 5.5 cm in diameter.

To protect fans 20, 22 from damage and avoid exposing users to the blades of fans 20, 22, inlet 16 and outlet 18 are covered by grills 24. Grills 24 include a plurality of louvers stamped into housing 12 that define a plurality of slits that allow air to flow into inlet 16 and outlet 18. Additional details of suitable grills with louvers are provided in U.S. Pat. Nos. 6,761,159 and 6,538,881, the disclosures of which are expressly incorporated by reference herein. Grills 24 are 8 cm long and 5 cm tall.

Depending on the location on housing 12, pressure differences exists between the interior and exterior of housing 12. To create air flow through housing 12, fans 20, 22 creates pressure differences between the exterior and interior of housing 12. For example, fan 20 creates negative pressure in inlet 16 that draws air into housing 12. Fan 20 also creates positive pressure in the interior of housing 12. Air under positive pressure will attempt to escape to areas of low pressure, such as the exterior of housing 12. Outlet 18 provides one path for the air inside housing 12 to escape to the exterior. In addition to inlet fan 20, outlet fan 22 also creates pressure that moves air through housing 12. On its interior side, outlet fan 22 creates negative pressure relative to the interior of housing 12. On its exterior side, outlet fan 22 creates positive pressure relative to the interior of housing 12. This combination of negative and positive pressures draws air from within housing 12 toward outlet 18 and pushes it through outlet 18.

Other than inlet 16 and outlet 18, housing 12 is relatively air impermeable to maximize the flow of air over components 14. Some air may "leak" into or out of housing 12 at seams or other openings (not shown) in housing 12. Because housing 12 is relatively air impermeable, most of the air drawn into inlet 16 moves over components 14 before exiting through outlet 18. This assists in maximizes the amount of heat removed from the interior of housing 12. Because housing 12 is relatively air impermeable, it maintains the pressure differences between the interior and exterior of housing 12 created by fans 20, 22.

One drawback of fans 20, 22 is that they generate noise that can be annoying depending on the frequency and level of noise. Fans 20, 22 are axial fans. Many axial fans act as dipole noise sources that provide two noise sources that are 180 degrees out of phase. For illustration, one of the noise sources is designated as a positive noise source and the other noise source is designated a negative noise source. The positive noise source is positioned on one side of each fan 20, 22 and the negative noise source is positioned on the other side of each fan 20, 22. Because the positive and negative noise sources are 180 degrees out of phase, some of the noise generated by each noise source will cancel when they interact.

Housing 12 interferes with the interaction of the positive and negative noise sources. Because fans 20, 22 are positioned inside housing 12, it creates a barrier between the positive and negative noise sources that blocks interaction between the positive and negative noise sources. Because there is less interaction, there is less noise cancellation.

Because fan 20 is positioned adjacent inlet 16, one of the dipole noise sources is positioned in housing 12 and the other is positioned outside of housing 12. Similarly, because fan 22 is positioned adjacent outlet 18, one of the dipole noise sources is positioned in housing 12 and the other is positioned outside of housing 12. For illustrative purposes, the positive noise sources for each fan 20, 22 may be positioned outside of housing 12 and the negative noise sources may be "trapped" inside housing 12. Because housing 12 blocks interaction between the positive noise sources positioned outside of housing 12 and the negative noise sources positioned inside of housing 12, there is less interaction between the positive and negative noise sources that results in less noise cancellation. Because less of the noise cancels, the volume or energy power of the noise is greater and more bothersome.

In addition to blocking interaction of the two noises sources, housing 12 traps noise in the interior of the housing creating an acoustical cavity that has interior resonances. Because of these resonances, the trapped noise is amplified creating additional annoyance.

Figure 3:
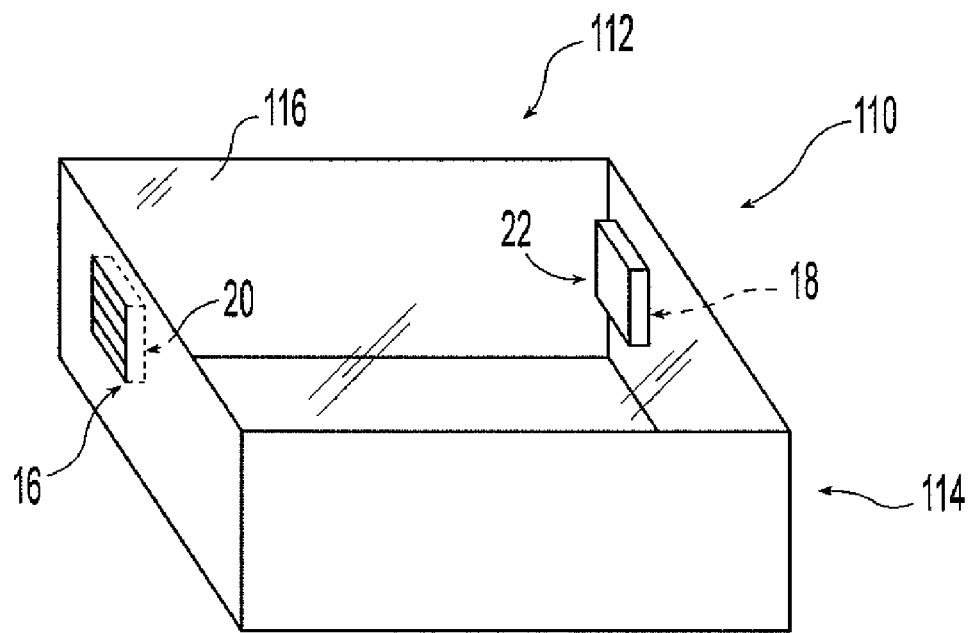
FIG. 3 is a view similar to FIG. 1 showing an alternative embodiment air-cooled, electronic apparatus including a housing having an inlet, an outlet, and a top portion made of an acoustically and optically transparent material.
Figure 4:
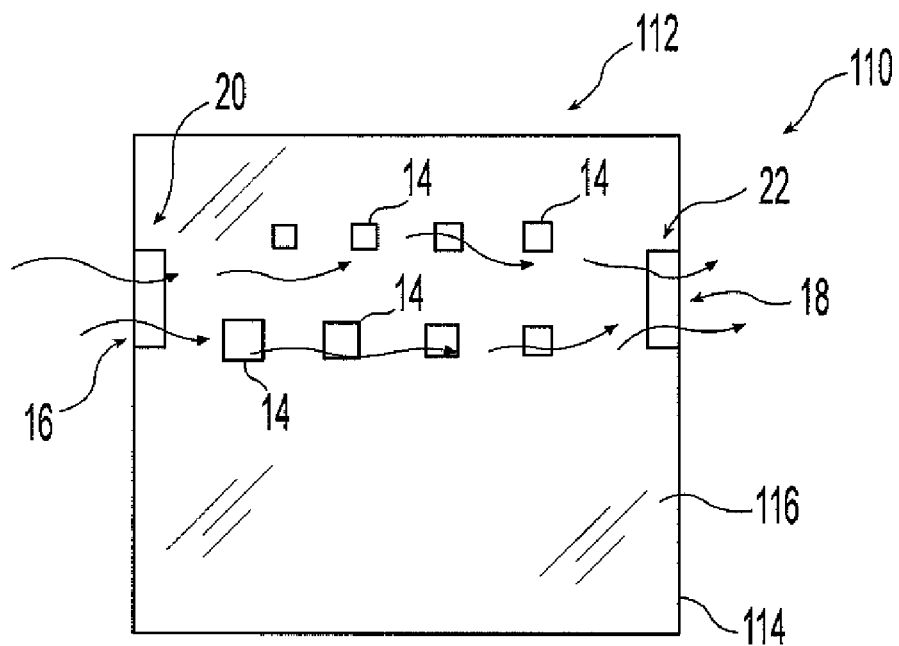
FIG. 4 is a view similar to FIG. 2 of the air-cooled, electronic apparatus of FIG. 3 showing the fans and electronic components that generate heat.

An air-cooled electronic apparatus 110 according to one embodiment of the present disclosure is shown in FIG. 3. Apparatus 110 is similar to apparatus 10 described above and includes a housing 112 and several electronic components 14 positioned in an interior of housing 112 as shown in FIG. 4. Housing 112 of apparatus 110 includes a main portion 114 made of stamped steel and a top portion 116 made of a sheet of MYLAR-brand polyester film. Main portion 114 includes the four sides and bottom of housing 112. Together, main portion 114 and top portion 116 cooperate to define the interior of housing 112. The junction between main portion 114 and top portion 116 is preferably sealed to block air from leaking into or out of housing 112 through the junction.

Main portion 114 includes inlet 16 and outlet 18 to facilitate the flow of air into and out of housing 112 to remove the waste heat. Apparatus 110 also includes inlet fan 20 and outlet fan 22 that pull air into inlet 16 and push air out of outlet 18. As shown in FIG. 4, air flows between inlet 16 and outlet 18 and flows over components 14 and removes enough waste heat from the interior of housing 112 to avoid overheating.

Other than inlet 16 and outlet 18, main and top portions 114, 116 of housing 112 are relatively air impermeable to maximize the flow of air over components 14. Because housing 112 is relatively air impermeable, most of the air drawn into inlet 16 moves over components 14 before exiting through outlet 18. This assists in maximizes the amount of heat removed from the interior of housing 112. Because housing 112 is relatively air impermeable, it maintains the pressure differences between the interior and exterior of main and top portions 114, 116 of housing 112 created by fans 20, 22.

MYLAR-brand polyester film is acoustically transparent and air impermeable. Because top portion 116 is made of MYLAR-brand polyester film, it is acoustically transparent. This acoustical transparency permits interaction between the positive and negative noise sources of fans 20, 22 and results in cancellation of the some of the noise.

Because fan 20 is positioned adjacent inlet 16, one of the dipole noise sources is positioned in housing 112 and the other is positioned outside of housing 112. Similarly, because fan 22 is positioned adjacent outlet 18, one of the dipole noise sources is positioned in housing 112 and the other is positioned outside of housing 112. For illustrative purposes, the positive noise sources for each fan 20, 22 may be positioned outside of housing 112 and the negative noise sources may be positioned inside housing 112.

Because top portion 116 of housing 112 is acoustically transparent, it allows interactions between the positive noise sources positioned outside of housing 112 and the negative noise sources positioned inside of housing 112. Thus, there is more interaction between the positive and negative noise sources that results in more noise cancellation. Because more of the noise cancels, the volume or energy power of the noise is lower and less bothersome. For example, during testing 30.8 decibels of noise were measured for apparatus 10 with housing 12 at 328 Hz, the fundamental frequency of fans 20, 22, with a reference power of $10^{-12}$ watts. Whereas, 16.7 decibels of noise were measured for apparatus 110 with housing 112 at the fundamental frequency. Thus, by providing acoustically transparent top portion 116, there is a 14.1 decibel drop in the level of noise. Similarly, a 8.2 decibel drop in noise was measured at the first harmonic of the fundamental frequency.

In addition to the noise cancellation between dipole noise sources, acoustically transparent top portion 116 (and the other acoustically transparent portions described herein) creates a window that prevents noise from being trapped in housing 112 that may otherwise contribute to the interior resonances that amplify the level of noise. By allowing the noise to escape, the amplification caused by the interior resonances is reduced. Thus, the acoustically transparent portions provide damping for the acoustical cavity defined by the housings.

Figure 5:
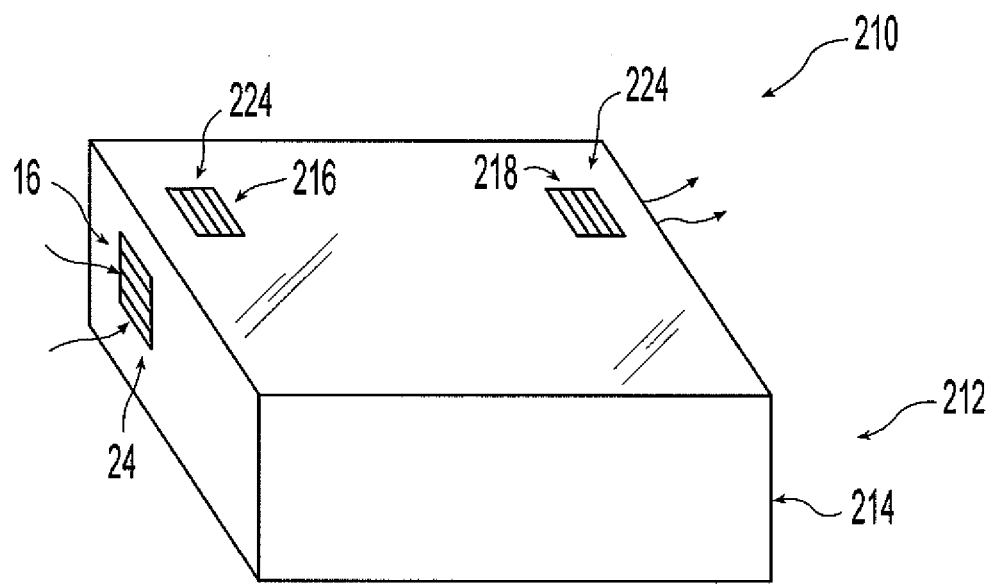
FIG. 5 is a view similar to FIG. 1 showing another alternative embodiment air-cooled, electronic apparatus including a housing having an inlet, an outlet, and a pair of acoustically transparent portions in the top of the housing.

Another air-cooled electronic apparatus 210 according to another embodiment of the present disclosure is shown in FIG. 5. Apparatus 210 is similar to apparatus 10 described above and includes a housing 212 and several electronic components positioned in an interior of housing 212. Housing 212 of apparatus 210 includes a main portion 214 made of stamped steel and first and second acoustically transparent portions 216, 218. Main portion 214 includes the four sides, bottom, and most of the top of housing 212. Thus, main portion 214 forms at least 98 percent of the exterior of housing 212.

Each acoustically transparent portion 216, 218 includes a sheet of MYLAR-brand polyester film positioned under a grill 224 identical to grills 24. Together, main portion 214 and acoustically transparent portions 216, 218 cooperate to define the interior of housing 212. The junctions between main portion 214 and MYLAR-brand polyester sheet of the acoustically transparent portions 216, 218 are sealed to block air from leaking into or out of housing 212 through the junctions. Grill 224 is 5 cm wide and 8 cm long.

Figure 6:
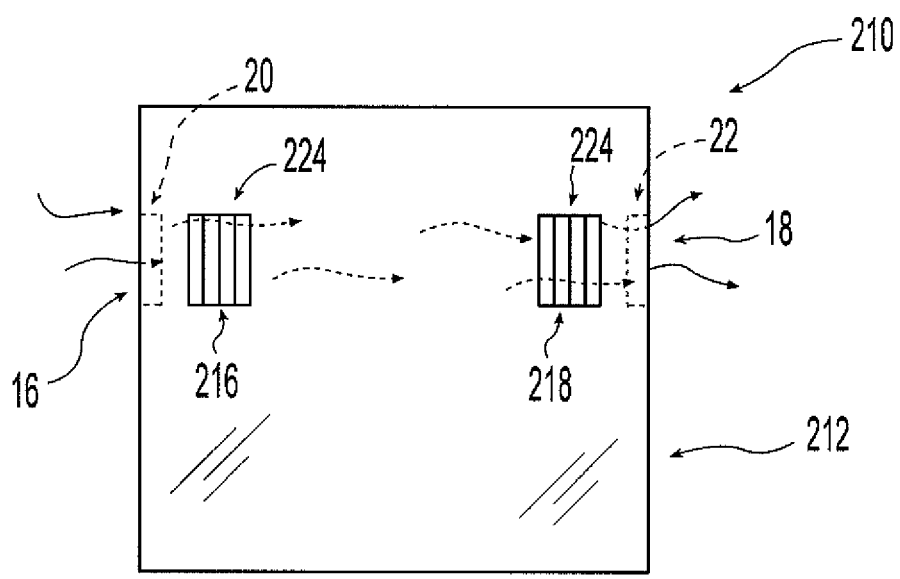
FIG. 6 is a view similar to FIG. 2 of the air-cooled, electronic apparatus of FIG. 5 showing air flowing into and out of the housing to cool the electronic components (not shown) positioned in the housing.

Main portion 214 includes inlet 16 and outlet 18 to facilitate the flow of air into and out of housing 212 to remove the waste heat. Inlet 16 is perpendicular or transverse to acoustically transparent portion 216 and outlet 18 is in a plane that is perpendicular or transverse to acoustically transparent portion 218. Apparatus 210 also includes inlet fan 20 and outlet fan 22 that pull air into inlet 16 and push air out of outlet 18. As shown in FIG. 6, air flows between inlet 16 and outlet 18 and flows over the heat generating electronic components and removes enough waste heat from the interior of housing 212 to avoid overheating.

Other than inlet 16 and outlet 18, main and acoustically transparent portions 214, 216, 218 of housing 212 are relatively air impermeable to maximize the flow of air over the components in housing 212. Because housing 212 is relatively air impermeable, most of the air drawn into inlet 16 moves over the components before exiting through outlet 18. This assists in maximizes the amount of heat removed from the interior of housing 212. Because housing 212 is relatively air impermeable, it maintains the pressure differences between the interior and exterior of main and acoustically transparent portions 214, 216, 218 of housing 212 created by fans 20, 22.

Because acoustically transparent portions 216, 218 are made of MYLAR-brand polyester film, they are acoustically transparent. This acoustical transparency permits interaction between the positive and negative noise sources of fans 20, 22 and results in cancellation of the some of the noise.

Because fan 20 is positioned adjacent inlet 16, one of the dipole noise sources is positioned in housing 212 and the other is positioned outside of housing 212. Similarly, because fan 22 is positioned adjacent outlet 18, one of the dipole noise sources is positioned in housing 212 and the other is positioned outside of housing 212. For illustrative purposes, the positive noise sources for each fan 20, 22 may be positioned outside of housing 212 and the negative noise sources are positioned inside housing 212.

Because portions 216, 218 of housing 212 are acoustically transparent, they allow interactions between the positive noise sources positioned outside of housing 212 and the negative noise sources may be positioned inside of housing 212. Thus, there is more interaction between the positive and negative noise sources that results in more noise cancellation. Because more of the noise cancels, the volume or energy power of the noise is lower and less bothersome. For example, during testing 30.8 decibels of noise were measured for apparatus 10 with housing 12 at 328 Hz, the fundamental frequency of fans 20, 22, with a reference power of $10^{-12}$ watts. Whereas, 26.8 decibels of noise were measured for apparatus 210 with housing 212 at the fundamental frequency. Thus, by providing acoustically transparent top portions 216, 218, there is a 4.0 decibel drop in the level of noise. Similarly, a 3.9 decibel drop in noise was measured at the first harmonic of the fundamental frequency.

Figure 7:
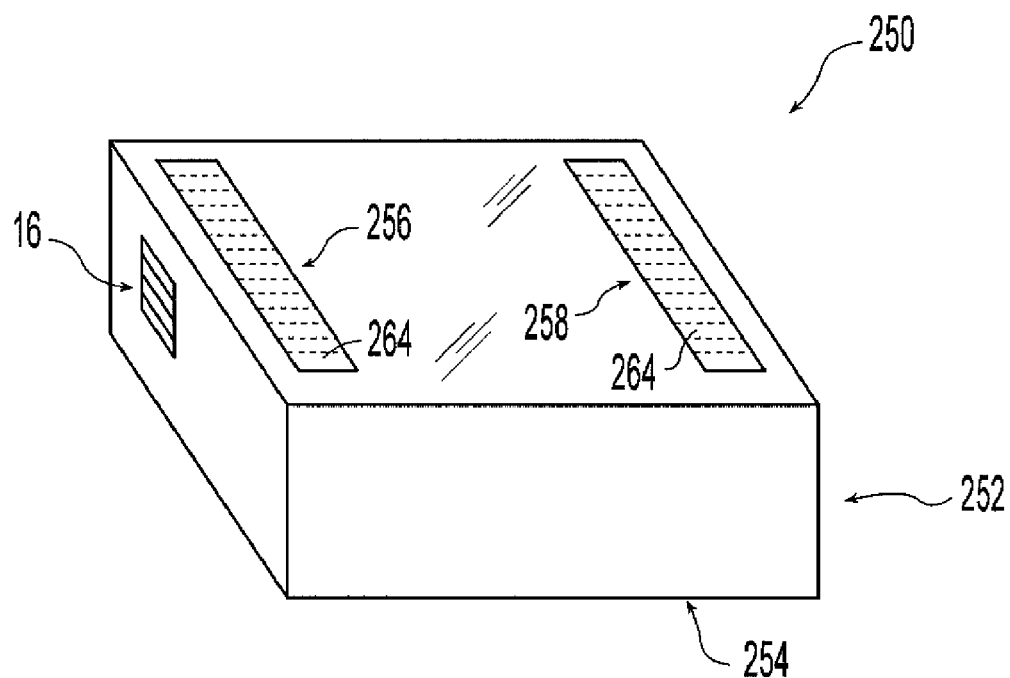
FIG. 7 is a view similar to FIG. 1 showing another alternative embodiment air-cooled, electronic apparatus including a housing having an inlet, an outlet, and a pair of elongated acoustically transparent portions in the top of the housing.

Another air-cooled electronic apparatus 250 according to another embodiment of the present disclosure is shown in FIG. 7. Apparatus 250 is similar to apparatus 10 described above and includes a housing 252 and several electronic components positioned in an interior of housing 252. Housing 252 of apparatus 250 includes a main portion 254 made of stamped steel and first and second acoustically transparent portions 256, 258. Main portion 254 includes the four sides, bottom, and most of the top of housing 252. Thus, main portion 254 forms at least 90 percent of the exterior of housing 252.

Each acoustically transparent portion 256, 258 includes a sheet of MYLAR-brand polyester film positioned under a perforated panel 264. Together, main portion 254 and acoustically transparent portions 256, 258 cooperate to define the interior of housing 252. The junctions between main portion 254 and MYLAR-brand polyester film of the acoustically transparent portions 256, 258 are sealed to block air from leaking into or out of housing 252 through the junctions. Panel 264 is 26.5 cm long and 7 cm wide. Panel 264 includes a plurality of circular holes or perforations that are 1.7 mm in diameter and the distance between the circular holes is 2.5 mm so that about 38% of panel 264 is defined by the perforations. According to alternative embodiments of the present disclosure, other sizes and shapes of perforations are provided.

Main portion 254 includes inlet 16 and outlet 18 to facilitate the flow of air into and out of housing 252 to remove the waste heat. Inlet 16 is perpendicular or transverse to acoustically transparent portion 256 and outlet 18 is in a plane that is perpendicular or transverse to acoustically transparent portion 258. Apparatus 250 also includes inlet fan 20 and outlet fan 22 that pull air into inlet 16 and push air out of outlet 18.

Figure 8:
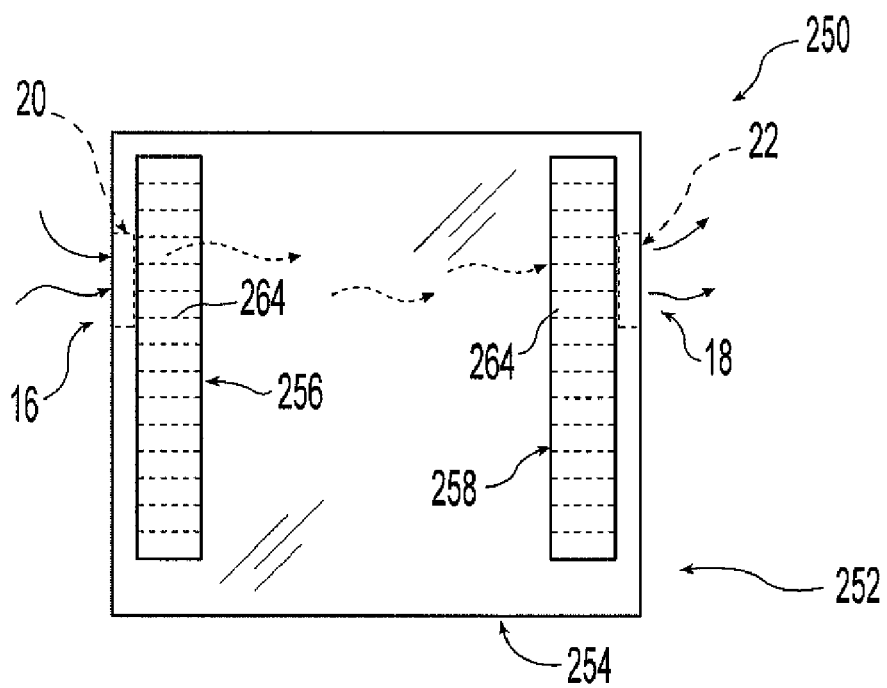
FIG. 8 is a view similar to FIG. 2 of the air-cooled, electronic apparatus of FIG. 7 showing air flowing into and out of the housing to cool the electronic components (not shown) positioned in the housing.

As shown in FIG. 8, air flows between inlet 16 and outlet 18 and flows over the heat generating electronic components and removes enough waste heat from the interior of housing 252 to avoid overheating.

Other than inlet 16 and outlet 18, main and acoustically transparent portions 254, 256, 258 of housing 252 are relatively air impermeable to maximize the flow of air over the components in housing 252. Because housing 252 is relatively air impermeable, most of the air drawn into inlet 16 moves over the components before exiting through outlet 18. This assists in maximizes the amount of heat removed from the interior of housing 252. Because housing 252 is relatively air impermeable, it maintains the pressure differences between the interior and exterior of main and acoustically transparent portions 254, 256, 258 of housing 252 created by fans 20, 22.

Because acoustically transparent portions 256, 258 are made of MYLAR-brand polyester film, they are acoustically transparent. This acoustical transparency permits interaction between the positive and negative noise sources of fans 20, 22 and results in cancellation of the some of the noise.

Because portions 256, 258 of housing 252 are acoustically transparent, they allow interactions between the positive noise sources positioned outside of housing 252 and the negative noise sources may be positioned inside of housing 252. Thus, there is more interaction between the positive and negative noise sources that results in more noise cancellation. Because more of the noise cancels, the volume or energy power of the noise is lower and less bothersome.

Figure 9:
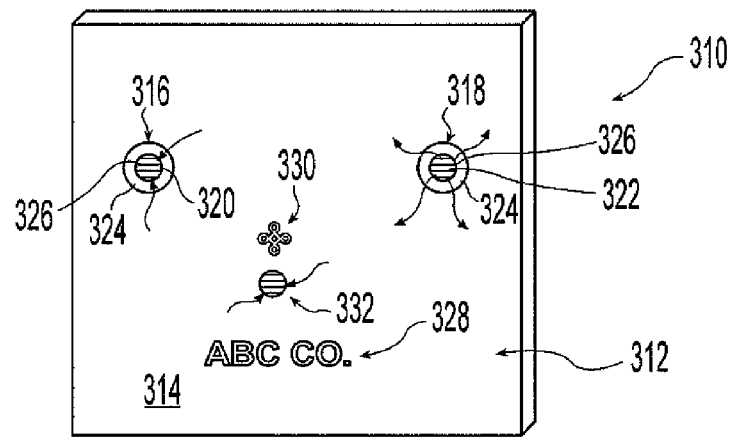
FIG. 9 is a back perspective view of another alternative embodiment air-cooled, electronic apparatus showing air flowing into an inlet that is surrounded by an acoustically transparent portion, air flowing out of an outlet that is surrounded by an acoustically transparent portion, and a trademark symbol and a company name that are also acoustically transparent.

Another air-cooled electronic apparatus 310 according to another embodiment of the present disclosure is shown in FIG. 9. Apparatus 310 is preferably a flat-screen television and includes a back housing 312 and several electronic components positioned in an interior of housing 312. A viewing surface is positioned on the front (not shown) of apparatus 310. Additional details of suitable televisions are provided in U.S. Pat. Nos. 6,034,737; 6,757,029; D500,0991; D491,541; and D488,451, the disclosures of which are incorporated by reference herein.

Housing 312 of apparatus 310 includes a main portion 314 made of plastic or stamped steel and first and second acoustically transparent, annular portions 316, 318. Each annular portion 316, 318 includes a sheet of MYLAR-brand polyester film positioned under an annular grill 324 similar to grills 24. Together, main portion 314, annular portions 316, 318, and the television screen (not shown) cooperate to define the interior of housing 312. The junctions between main portion 314 and annular portions 316, 318 and main portion 314 and the television screen are sealed to block air from leaking into or out of housing 312 through the junctions.

Housing 312 includes inlet 320 and outlet 322 to facilitate the flow of air into and out of housing 312 to remove waste heat generated by electronic components positioned in housing 312. Inlet 320 has a circular grill 326 and is formed in first annular portion 316 and outlet 322 has a circular grill 326 and is formed in second annular portion 318. Thus, first and second annular portions 316, 318 surround inlet 320 and outlet 322 as shown in FIG. 9. According to alternative embodiments of the present disclosure, the annular portions only partially surround the inlet and outlet.

Apparatus 310 also includes inlet fan 20 and outlet fan 22 that pull air into inlet 320 and push air out of outlet 322. Inlet fan 20 is positioned behind grill 326 of inlet 320 and outlet fan 22 is positioned behind grill 326 of outlet 322 portion 318. As shown in FIG. 9, air flows between inlet 320 and outlet 322 and flows over the heat generating electronic components to remove enough waste heat from the interior of housing 312 to avoid overheating.

Other than inlet 320 and outlet 322, main and annular portions 314, 316, 318 of housing 312 and the television screen are relatively air impermeable to maximize the flow of air over the components in housing 312. Because housing 312 is relatively air impermeable, most of air drawn into inlet 320 moves over the components before exiting through outlet 322. This assists in maximizes the amount of heat removed from the interior of housing 312. Because housing 312 is relatively air impermeable, it maintains the pressure differences between the interior and exterior of main and annular portions 314, 316, 318 of housing 312 created by fans 20, 22.

Because acoustically transparent portions 316, 318 are made of MYLAR-brand polyester film, they are acoustically transparent. This acoustical transparency permits interaction between the positive and negative noise sources of fans 20, 22 and results in cancellation of the some of the noise.

Because fan 20 is positioned adjacent inlet 320, one of the dipole noise sources is positioned in housing 312 and the other is positioned outside of housing 312. Similarly, because fan 22 is positioned adjacent outlet 322, one of the dipole noise sources is positioned in housing 312 and the other is positioned outside of housing 312. For example, the positive noise sources for each fan 20, 22 may be positioned outside of housing 312 and the negative noise sources are positioned inside housing 312.

As shown in FIG. 9, first acoustically transparent, annular portion 316 is positioned around inlet 320 to inlet fan 20 and second acoustically transparent, annular portion 318 is positioned around outlet 322 from outlet fan 22. Because portions 316, 318 of housing 312 are acoustically transparent, they allow interaction between the positive noise sources positioned outside of housing 312 and the negative noise sources positioned inside of housing 312. Thus, there is more interaction between the positive and negative noise sources that results in more noise cancellation.

Also shown in FIG. 9 is an alternative placement of an inlet 332. Alternative acoustically transparent portions 328, 330 are also shown. Acoustically transparent portion 328 is in the form of a company name (ABC Co.). Openings are provided in main portion 314 of housing 312 in the form of the company name. The opening are then covered and sealed by an acoustically transparent material, such as MYLAR-brand polyester film. Similarly, acoustically transparent portion 330 is in the form of a company logo. An opening is provided in main portion 314 of housing 312 in the form of at least the outline of the company logo. The opening is then covered and sealed by an acoustically transparent material, such as MYLAR-brand polyester film. Because portions 328, 330 of housing 312 are acoustically transparent, they allow interactions between the positive noise sources positioned outside of housing 312 and the negative noise sources positioned inside of housing 312. Thus, there is more interaction between the positive and negative noise sources that results in more noise cancellation.

Figure 10:
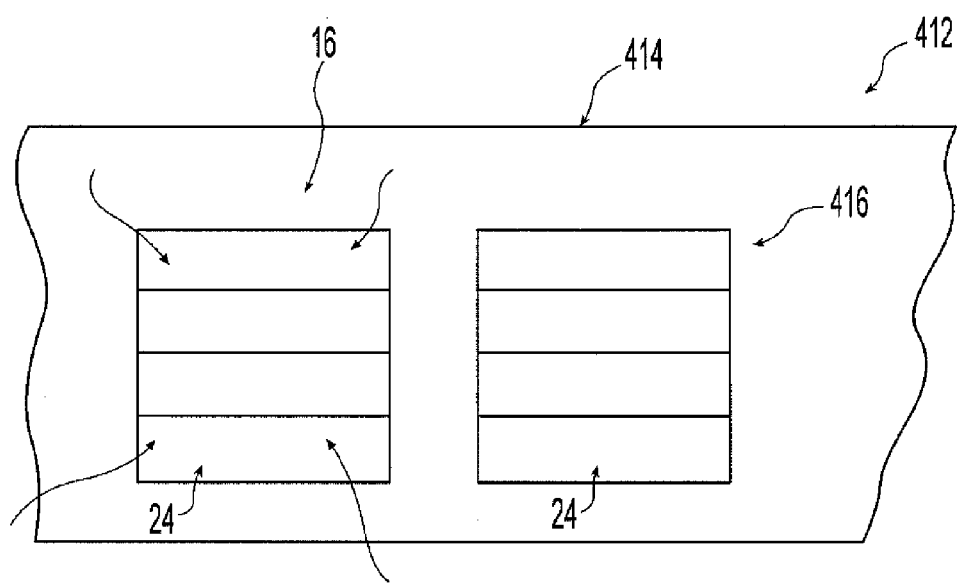
FIG. 10 is a view of a portion of a housing of another housing showing an inlet and an acoustically transparent portion positioned adjacent to the inlet.

A portion of another housing 412 is shown FIG. 10. Housing 412 is similar to housing 12 shown in FIGS. 1 and 2 and includes a main portion 414 having an inlet 16 and an outlet 18. Housing 412 further includes a pair of acoustically transparent portions 416 (only one shown) substantially similar to acoustically transparent portions 216, 218 of housing 212. However, one of the acoustically transparent portions 416 is positioned on the same wall of main portion 414 as inlet 16, as shown in FIG. 10, and one of the acoustically transparent portions 416 is positioned on the same wall of main portion 414 as outlet 18. Thus, according to this embodiment, similar to apparatus 310, inlet 16 and acoustically transparent portion 416 are positioned in the same or parallel planes, 180 degrees apart. Likewise, outlet 18 and the other transparent portion 416 (not shown) are positioned in the same or parallel planes, 180 degrees apart.

Figure 11:
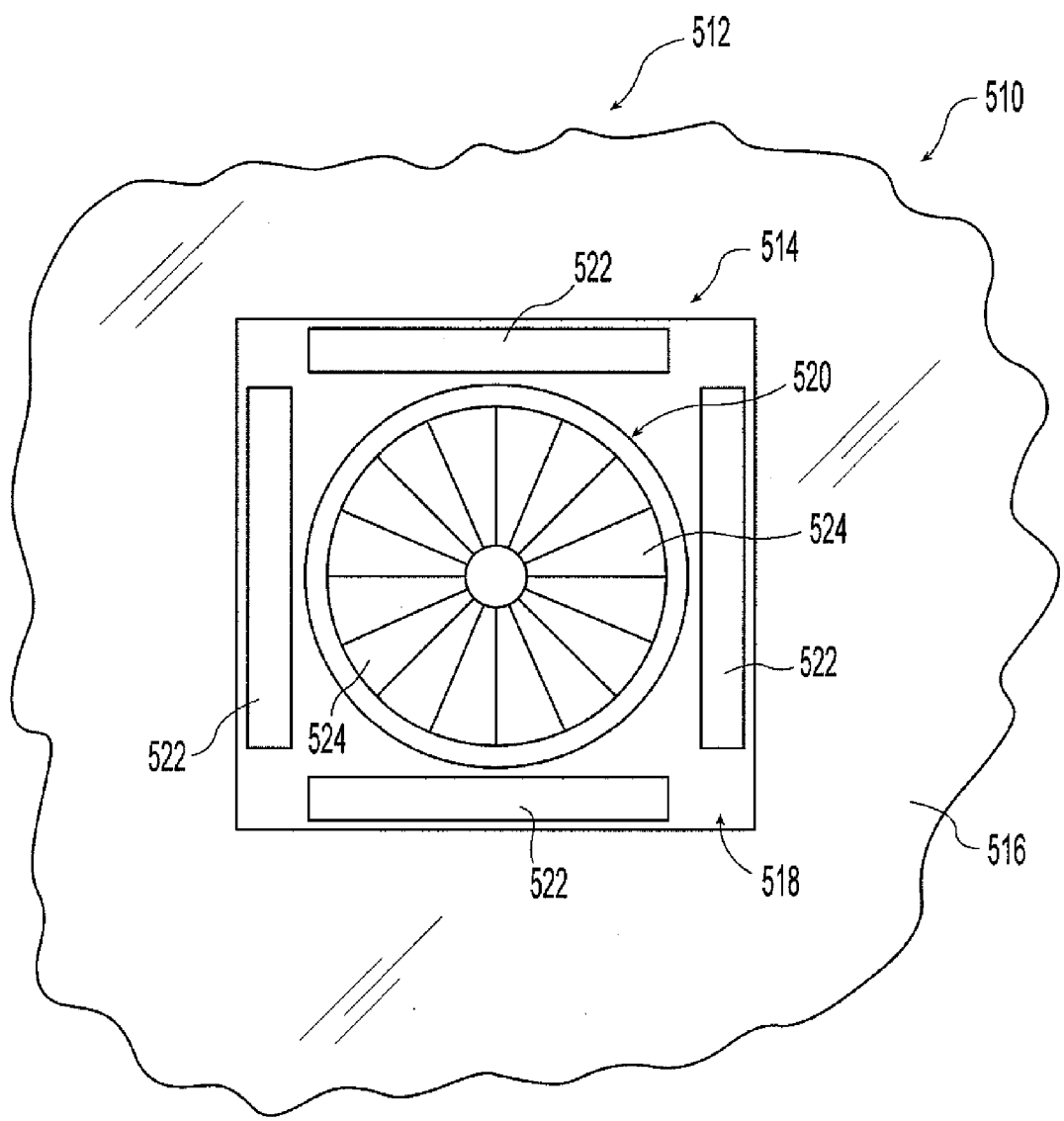
FIG. 11 is a side elevation view of a fan unit showing the fan unit including a housing, a fan, and several acoustically transparent portions incorporated into the housing.

A portion of another air-cooled electronic apparatus 510 according to another embodiment of the present disclosure is shown in FIG. 11. Apparatus 510 includes a fan unit 514 and a main housing portion 516. Fan unit 514 is preferably mounted to main housing portion 516. Fan unit 514 includes a fan housing or chassis 518, a fan 520 rotationally coupled to chassis 518, and a plurality of acoustically transparent portions 522 coupled to fan housing 518. Main housing portion 516 is similar to the other main housing portions described herein. Together, main housing portion 516, fan housing 518, and acoustically transparent portions 522 cooperate to define a housing 512 that separates the interior and exterior of apparatus 510.

Fan 520 includes a plurality of fan blades 524 and an electric motor (not shown) that rotates fan blades 524. Additional details of fan 520 are provided in the patents previously incorporated by reference herein. Fan unit 514 may be used in any of the devices described herein that are provided with fans 20, 22 or any other fans.

Acoustically transparent portions 522 are preferable made of MYLAR-brand polyester film. Main portion 516 is made of plastic or stamped steel, and fan housing 518 and fan blades 524 are preferably made of plastic. A grill (not shown) may also be provided over fan unit 514 such as grill 24 described above. As shown in FIG. 11, four acoustically transparent portions 522 are provided that are rectangular in shape. According to alternative embodiments, other numbers and shapes of acoustically transparent portions are provided such as an annular portion.

Similar to the other acoustically transparent portions described herein, acoustically transparent portions 522 permit noise from one side of fan unit 514 to cancel with noise from the other side of fan unit 514 to reduce the overall level of noise. The acoustically transparent portions 522 also allows noise to escape from within housing 512 to reduce resonances within housing 512.

In addition to MYLAR-brand polyester film, other acoustically transparent materials are provided for the acoustically transparent or noise transfer portions disclosed herein. For example, according to other embodiments of the present disclosure, other acoustically transparent materials are provided such as sintered materials (metals or other materials), compressed wire materials (metals or other materials), sheets open or closed-cell foams, other plastic sheet materials, porous material, and other acoustically transparent materials known to those of ordinary skill in the art are provided. According to one embodiment, the acoustically transparent material, for example a porous material, is selected to block the transmission of high frequencies, but allow the fundamental and first few harmonics of the fan to pass through. Such a material allows the noise cancellation between the dipole noise sources at the fundamental and harmonic frequencies, but blocks the higher frequencies from propagating outside the housing.

Preferably, the acoustically transparent materials have a noise transmission loss of about 6 decibels or less; although, greater transmission losses may also be provided for the acoustically transparent materials. According to other embodiments of the present disclosure, transmission losses of 10, 9, 8, 7, 6, 5, 4, 3, 2, 1, and 0.5 decibels are provided for the acoustically transparent portions of the housings.

According to the preferred embodiment of the present disclosure, main portions 14, 114, 214, 254, 314, 414, 516 are acoustically opaque and have noise transmission losses of about 6 decibels or greater; although lower transmissions losses may be provided. According to other alternative embodiments of the present disclosure, the entire housing is made of acoustically transparent material.

According to alternative embodiments of the present disclosure, other sizes, shapes, numbers, and positions of acoustically transparent portions are provided. For example, according to some embodiments, the acoustically transparent portions are squares, rectangles, ovals, or other shapes known to those of ordinary skill in the art. According to other embodiments the acoustically transparent portions have multiple transparent portions partially or completely surrounded by acoustically or opaque portions, such as clusters of acoustically transparent portions provided in acoustically opaque materials.

As mentioned above, fans 20, 22, 520 of the present disclosure have a fundamental frequency of 328 Hz. According to other embodiments, fans having other fundamental frequencies are provided, such as about 900 Hz, about 500 Hz or less, or other fundamental frequencies of fans and other devices known to those of ordinary skill in the art. In addition to the two fan apparatus described above, other apparatus having fewer or more fans may be provided. For example, according to one embodiment, only an inlet or outlet fan is provided. According to another embodiment, additional inlet and outlet fans are provided. Furthermore, fewer or more inlets and outlets may be provided with or without fans.

In addition to televisions, other apparatus with electronic components that generate heat may be provided with acoustically transparent portions to allow additional interaction between dipole noise sources. For example, according to other embodiments, acoustically transparent portions are provided on DVD, CD, and VCR players; HD or satellite receivers; tuners; amplifiers; computers; game machines; any other electronic devices; or subcomponents of these devices such as cooling fans provided on microprocessors. According to other embodiments, the apparatus is provided for moving air without a concern for removing waste heat. For example, according to some embodiments, acoustically transparent portions are provided on exhaust fans, such has those provided for kitchen ranges, restrooms, chemical hoods, and other situations known to those of ordinary skill in the art where the goal is to move air from one location to another.

In addition to axial fans, other apparatus demonstrate dipole noise sources. For example, a vibrating sheet generates noise as a dipole noise source. According to an embodiment of the present disclosure, one or more of the acoustically transparent portions disclosed herein is provided on a vibrating sheet to permit the positive and negative noise source of the dipole to interact and cancel. This cancellation result in a lowering of the overall noise volume. Acoustically transparent portions may also be provided in other mediums. For example, the acoustically transparent portions disclosed herein may be provided in other fluids such as water to reduce the noise created by propulsors, propellers, pumps, or other devices that operate in water. The acoustically transparent portions disclosed herein may also be provided for multipole noise sources other than dipole noise sources. For example, the acoustically transparent portions may also be provided on quadrupole, octopole, or other multipole noise sources. According to other embodiments, the acoustically transparent portions are provided for monopole noise sources.

To maximize the flow of air through the housings, the acoustically transparent portions disclosed herein are substantially air impermeable. Some embodiments of the acoustically transparent portions are completely air impermeable so they do not allow any air to pass through. Other embodiments of the acoustically transparent portions are not completely air impermeable, but permit a limited amount of air to pass through. By allowing air to pass through the acoustically transparent portions, the overall cooling efficiency (i.e. amount of fan power v. the amount of heat removed from the enclosure) more than likely decreases. Depending on the desired cooling efficiency, the amount of air that passes through the acoustically transparent portion may be adjusted.

According to one embodiment of the present disclosure, 50% or more of the air flow into the enclosure is allowed to flow through the acoustically transparent portions. According to other embodiments, other portions of the air flow are permitted to flow through the acoustically transparent portions such as about 40%, 33%, 25%, 20%, 15%, 10%, 7.5%, 5%, 4%, 3%, 2%, 1%, 0.5%, 0.25%, or less. Similarly by allowing air to pass through the acoustically transparent portion, the pressure difference across the acoustically transparent portion will be less than the pressure difference between the interior and exterior of the housing created by the fans. According to one embodiment, the pressure difference across the acoustically transparent portion is about 50% of the pressure difference between the interior and exterior of the housing 60%, 67%, 75%, 80%, 85%, 90%, 92.5%, 95%, 96%, 97%, 98%, 99%, and 99.9% or more of the pressure difference between the interior and exterior of the housing.

During the design of an apparatus containing a fan or other noise source, the design will select the appropriate size, shape, and placement of one or more acoustically transparent portions on the housing or elsewhere. These criteria may be balanced against cooling efficiencies, the structural integrity of the housing or other components, and the degree of desired noise reduction. By knowingly or purposely selecting and positioning the acoustically transparent portions in an effort to reduce the noise, the noise cancellation between the multipole noise sources will increase and the effects of interior acoustical resonances will decrease. The noise cancellation and reduced resonances will lower the overall noise and reduce related annoyances.

Although the invention has been described in detail with reference to certain preferred embodiments, variations and modifications exist within the spirit and scope of the invention as described and defined in the following claims.

The invention claimed is:

1. An air-cooled electronic apparatus including
a housing having an acoustically transparent portion, an interior region, and an exterior region,
electronic components positioned in the interior region of the housing that generate heat, and
a fan creating air flow through the housing to remove the heat from the interior region of the housing, the fan creating a difference between the interior and exterior regions, a substantial portion of the pressure difference being maintained over the acoustically transparent portion of the housing, the fan creating a first noise source and a second noise source that is out of the phase with the first source, and noise from the first noise source passing through the acoustically transparent portion of the housing to cancel noise from the second noise source.

2. The air-cooled electronic apparatus of claim 1, wherein the acoustically transparent portion is air impermeable.

3. The air-cooled electronic apparatus of claim 1, wherein the housing further includes the acoustically opaque portion that defines a majority of the exterior of the housing and maintains the pressure difference between the interior and exterior regions of the housing.

4. The air-cooled electronics apparatus of claim 3, wherein the acoustically opaque portion of the housing defines at least 90 percent of the exterior of the housing.

5. The air-cooled electronic apparatus of claim 3, wherein the acoustically opaque portion of the housing has a noise transmission loss of about 6 decibels or more and the acoustically transparent portion of the housing has a noise transmission loss of about 6 decibels or less.

6. The air-cooled electronic apparatus of claim 1, wherein the fan has a fundamental frequency of less than 900 Hz.

7. The air-cooled electronic apparatus of claim 6, wherein the fan has a fundamental frequency of less than 500 Hz.

8. An air moving apparatus including
a housing having an inlet, an outlet, and a noise transfer portion that is acoustically transparent and substantially air impermeable, and
a fan creating a flow of air through the housing from the inlet to the outlet, a first portion of noise generated by the fan passing through the noise transfer portion of the housing and canceling with a second portion of noise generated by the fan.

9. The air moving apparatus of claim 8, wherein at least one of the inlet and outlet of the housing extends through the noise transfer portion of the housing.

10. The air moving apparatus of claim 8, wherein at least one of the inlet and outlet of the housing is positioned in a first plane and the noise transfer portion of the housing is positioned in a second plane that is substantially parallel to the first plane.

11. The air moving apparatus of claim 8, wherein at least one of the inlet and outlet of the housing is positioned in a first plane and the noise transfer portion of the housing is positioned in a second plane that is substantially transverse to the first plane.

12. The air moving apparatus of claim 8, wherein the noise transmission loss of the noise transfer portion of the housing is about 6 decibels or less.

13. The air moving apparatus of claim 7, wherein the air flow has a mass flow rate and less than 10 percent of the air flows through the noise transfer portion of the housing.

14. The air moving apparatus of claim 7, wherein the fan creates a pressure difference between an interior and an exterior of the housing and at least 90 percent of the pressure difference is maintained across the noise transfer portion of the housing.

15. A noise reduction arrangement including
a housing having a pressurized first region and a noise transmission portion separating the pressurized first region from a second region, the noise transmission portion substantially blocking the flow of air between the first and second regions
a first noise source emitting noise into the pressurized first region, and
a second noise source emitting noise into the second region, noise from at least one of the first and second noise sources passing through the noise transmission portion of the housing to cancel with noise from the other of the first and second noise sources.

16. The noise reduction arrangement of claim 15, wherein the noise transmission portion of the housing has a noise transmission loss of about 6 decibels or less.

17. The noise reduction arrangement of claim 15, wherein the housing further includes a noise blocking portion that defines at least 90 percent of a perimeter of the housing, and the noise blocking portion has a noise transmission loss of about 6 decibels or greater.

18. The noise reduction arrangement of claim 15, further comprising a fan that creates pressure in the pressurized first region and creates the first noise source and the second noise source.

19. The noise reduction arrangement of claim 18, wherein the housing includes an inlet and an outlet, the fan is positioned adjacent to at least one of the inlet and outlet and causes air to flow through the inlet and outlet of the housing, and a majority of the noise emitted by the second noise source travels through one of the inlet and outlet of the housing.

20. The noise reduction arrangement of claim 19, wherein the fan has a fundamental frequency and at least about 4 decibels of noise power at the fundamental frequency is cancelled by interaction of the first and second noise sources through the noise transmission portion of the housing.

* * * * *